Aug. 23, 1932.  R. F. KOHR  1,872,974
BRAKE
Filed Jan. 5, 1931

INVENTOR.
ROBERT F. KOHR
BY
ATTORNEY

Patented Aug. 23, 1932

1,872,974

UNITED STATES PATENT OFFICE

ROBERT F. KOHR, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 5, 1931. Serial No. 506,603.

This invention relates to supports for conduits and more particularly to conduit abutments.

Broadly, the invention comprehends a one piece clamping conduit abutment adaptable for the reception of the ends of the conduit forming a part of the cable conduit control for motor vehicle brakes. The device is particularly adaptable for the reception of that end of the conduit supported on the chassis frame of the vehicle. It comprises a bracket having an independent arm bent upon itself to provide a clamping sleeve, a portion of which is depressed to provide an abutment to prevent axial movement of the conduit.

An object of the invention is to provide a one piece clamp and abutment for a conduit.

Another object of the invention is to provide a one piece bracket having a dependent clamp and abutment adaptable for the reception of an end of a conduit.

A salient feature of the invention is a clamp having a depressed portion for resisting axial movement of a conduit.

Other objects and features of the invention will appear from the following description taken in connection with the drawing, which form a part of this specification, and in which.

Figure 1:
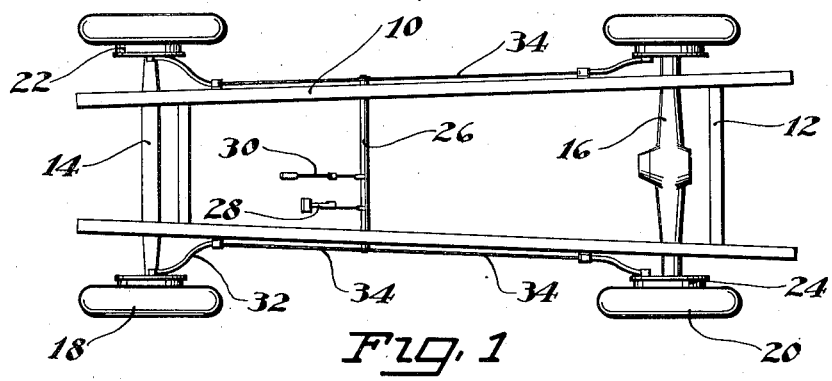
Figure 1 is a top plan view of a motor vehicle chassis illustrating the invention as applied.
Figure 2:
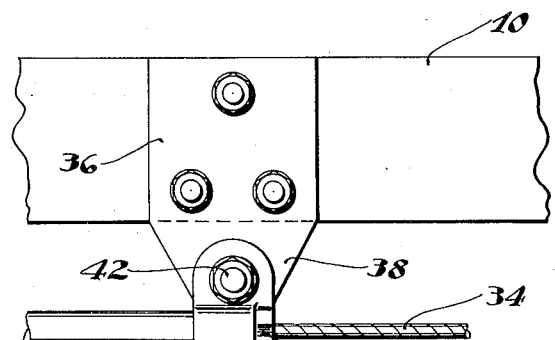
Figure 2 is a side elevation of a portion of a chassis frame illustrating the device supported thereon.
Figures 3, 4:
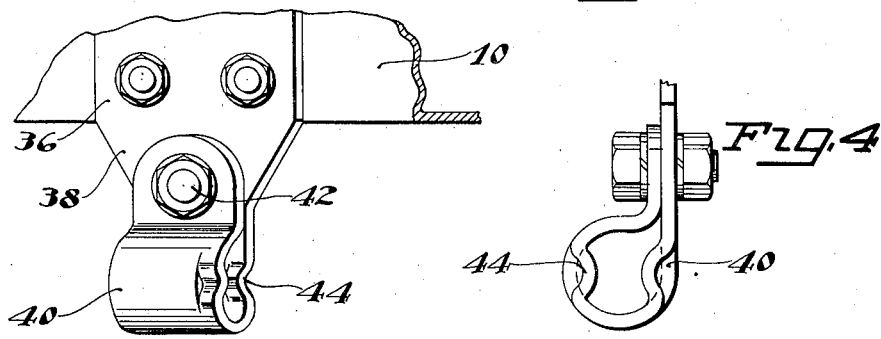
Figure 3 is an enlarged perspective view.
Figure 4 is an end elevation.

Referring to the drawing for more specific details of the invention. 10 represents the side rails of a chassis frame connected by cross rails 12. The frame is supported by springs, not shown, on a front axle 14 and a rear axle 16. The axles have positioned thereon the conventional front and rear wheels 18 and 20 equipped with front brakes 22 and rear brakes 24.

A rock shaft 26 is supported on the side rails 10 and suitably connected to the rock shaft is a foot pedal lever 28 and a hand lever 30. The rock shaft 26 is suitably connected by cables and conduits to the front brakes 22 and the rear brakes 24. As shown, conduits 32 are connected between the brake structures 22 and 24 and the side rails of the chassis frame to house the respective ends of cables 34 and to retain them in proper relation to the brake structures, so that relative movement between the frame and the brake structures will not tend to shorten or lengthen the cables, or in any way impair the operation of the control mechanism.

It is essential that the ends of the conduits be firmly supported and retained against axial movement. This is accomplished by the provision of a bracket 36 which may be bolted or otherwise secured to the side rails of the frame. This bracket has a dependent arm 38 bent upon itself to provide a split sleeve 40 adapted to be contracted by a transverse bolt 42 to clamp the end of the conduit in the sleeve portion 40. The sleeve portion 40 has a depressed section or end adapted to restrain the conduit against axial movement. As shown, one end of the sleeve 40 has struck portions 44 arranged in oppositely disposed relation to provide suitable abutments for the end of the conduit, so that axial movement of the conduit may be effectively prevented.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A conduit support comprising a bracket having a dependent portion bent upon itself to provide a sleeve, means for contracting the sleeve and diametrally arranged depressed portions on one end of the sleeve.

2. A conduit support comprising a bracket having an unbent portion and having a dependent portion bent upon itself to form a joint with the unbent portion and to provide a split sleeve, said bent portion having an inwardly struck indentation formed therein at a point spaced substantially 90 degrees from the joint, and means for contracting the joint.

In testimony whereof, I have hereunto signed my name.

ROBERT F. KOHR.